US010649221B2

(12) United States Patent
Tamura

(10) Patent No.: US 10,649,221 B2
(45) Date of Patent: May 12, 2020

(54) OPTICAL PROCESSING APPARATUS, METHOD FOR PROCESSING AN OBJECT

(71) Applicant: Asato Tamura, Ebina (JP)

(72) Inventor: Asato Tamura, Ebina (JP)

(73) Assignee: RICOH COMPANY, LTD., Tokyo (JP)

(*) Notice: Subject to any disclaimer, the term of this patent is extended or adjusted under 35 U.S.C. 154(b) by 268 days.

(21) Appl. No.: 15/824,034

(22) Filed: Nov. 28, 2017

(65) Prior Publication Data

US 2018/0259779 A1    Sep. 13, 2018

(30) Foreign Application Priority Data

Mar. 9, 2017   (JP) .................................. 2017-045115

(51) Int. Cl.
| | |
|---|---|
| *G02B 27/09* | (2006.01) |
| *B23K 26/06* | (2014.01) |
| *B23K 26/40* | (2014.01) |
| *G02B 5/00* | (2006.01) |
| *C03B 33/02* | (2006.01) |

(52) U.S. Cl.
CPC .......... *G02B 27/09* (2013.01); *B23K 26/0665* (2013.01); *B23K 26/40* (2013.01); *C03B 33/0222* (2013.01); *G02B 5/001* (2013.01); *G02B 27/095* (2013.01)

(58) Field of Classification Search
CPC ...... G02B 27/09; G02B 27/095; G02B 5/001; B23K 26/0665; B23K 26/40
USPC .................................................. 219/121.72
See application file for complete search history.

(56) References Cited

U.S. PATENT DOCUMENTS

| | | | |
|---|---|---|---|
| 5,834,766 A | 11/1998 | Suhara | |
| 6,016,223 A * | 1/2000 | Suzuki | G02B 27/09 |
| | | | 359/558 |
| 6,376,837 B1 | 4/2002 | Itabashi et al. | |
| 6,555,810 B1 | 4/2003 | Suhara | |
| 7,482,052 B2 | 1/2009 | Yamada et al. | |
| 8,411,123 B2 | 4/2013 | Suhara | |
| 8,451,309 B2 | 5/2013 | Suhara | |
| 9,146,493 B2 | 9/2015 | Suhara et al. | |
| 9,235,154 B2 | 1/2016 | Suhara et al. | |
| 9,513,573 B2 | 12/2016 | Tachibana et al. | |
| 9,517,636 B2 | 12/2016 | Suhara et al. | |
| 9,778,592 B2 | 10/2017 | Suhara et al. | |
| 9,817,330 B2 | 11/2017 | Tachibana et al. | |

(Continued)

FOREIGN PATENT DOCUMENTS

JP    2015-112644 A    6/2015

*Primary Examiner* — Tuan N Nguyen
(74) *Attorney, Agent, or Firm* — Oblon, McClelland, Maier & Neustadt, L.L.P.

(57) ABSTRACT

An optical processing apparatus includes a light source, a condensing lens, and a light shield. The light source emits a light. The condensing lens converts a light emitted from the light source into a Bessel beam and condenses the light onto a surface of an object. The light shield shields an outer edge portion of the light in a cross section of a direction orthogonal to the optical axis of the light. The light shield may shield the outer edge portion of the light after entering the condensing lens and before condensing onto the surface of the object in the cross section of the direction orthogonal to the optical axis of the light.

14 Claims, 6 Drawing Sheets

(56) References Cited

U.S. PATENT DOCUMENTS

2013/0044371 A1* 2/2013 Rupp ................... G02B 27/09
  359/432
2013/0341309 A1* 12/2013 Yamamoto ......... B23K 26/0665
  219/121.61

* cited by examiner

OPTICAL PROCESSING APPARATUS, METHOD FOR PROCESSING AN OBJECT

CROSS-REFERENCE TO RELATED APPLICATIONS

This patent application is based on and claims priority pursuant to 35 U.S.C. § 119(a) to Japanese Patent Application No. 2017-045115, filed on Mar. 9, 2017 in the Japan Patent Office, the entire disclosures of which is hereby incorporated by reference herein.

BACKGROUND

Technical Field

Embodiments of the present disclosure relate to an optical processing apparatus, a method for producing an optical object to be processed.

Related Art

An optical processing apparatus is known which has a condensing means for converting the beam of light emitted from a light source into a Bessel beam and condensing it, and the light beam for processing the object to be processed by a Bessel beam condensed on a processed surface of the object.

For example, a laser processing apparatus is known which has an axicon lens as the condensing means for converting the beam of laser light emitted from a laser light source into a Bessel beam and condensing it, and the laser beam for cutting a glass as the object to be processed by a Bessel beam condensed on a processed surface of the glass.

According to such a configuration, the surface to be processed can be made cleaner compared to a configuration in which laser cutting is performed only on a position where the focal point is on the surface side in the thickness direction of the glass substrate in the thickness direction by general laser light and the remaining portion is cut by propagation of cracks.

However, there was a problem that discoloration might occur in the cut surface (processed surface) and the vicinity thereof.

SUMMARY

In one aspect of this disclosure, there is provided an improved optical processing apparatus including a light source, a condensing lens, and a light shield. The light source emits light. The condensing lens converts a light emitted from the light source as a Bessel beam and condenses the light onto a surface of an object. The light shield that shields an outer edge portion of the light in a cross section of a direction orthogonal to the optical axis of the light, the light including at least one of the light before entering the condensing lens or the light after entering the condensing system and before condensing onto the surface of the object.

In another aspect of this disclosure, there is provided an improved method for processing an object including a condensing step, and a light shielding step. The condensing step for converting a light emitted from a light source as a Bessel beam and condensing the light onto a surface of an object. The light shielding step for shielding an outer edge portion of the light in a cross section of a direction orthogonal to the optical axis of the light, the light including at least one of the light before entering the condensing system or the light after entering the condensing system and before condensing onto the surface of the object.

BRIEF DESCRIPTION OF THE DRAWINGS

The aforementioned and other aspects, features, and advantages of the present disclosure will be better understood by reference to the following detailed description when considered in connection with the accompanying drawings, wherein.

DETAILED DESCRIPTION

Figure 1:
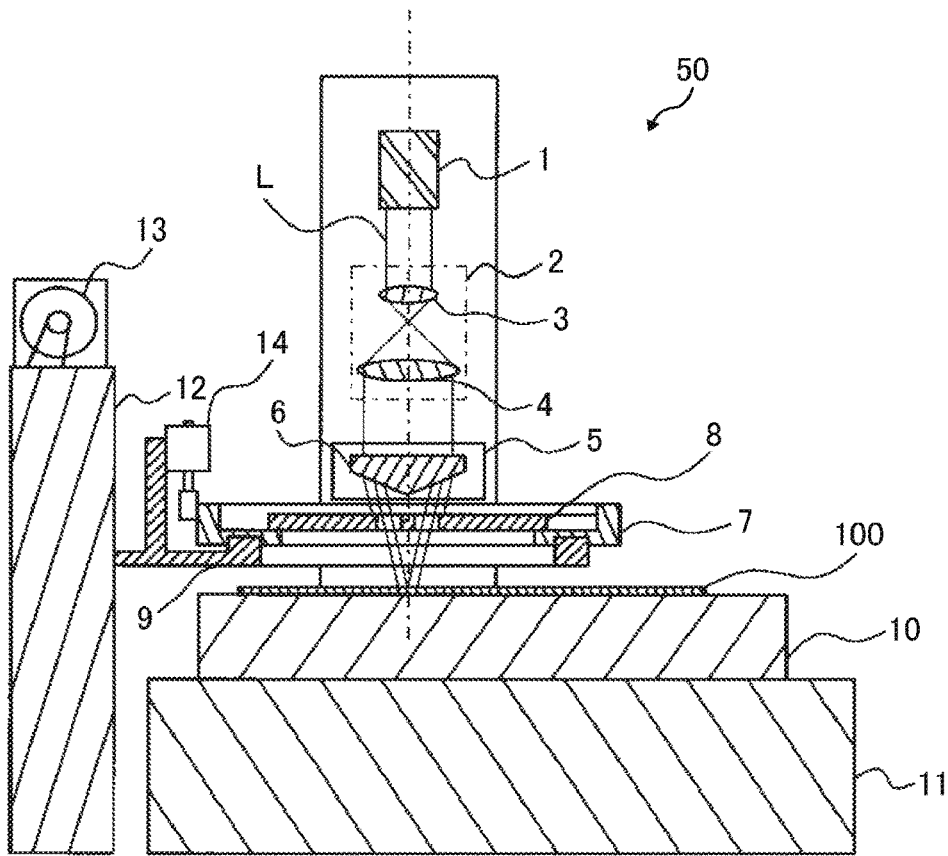
FIG. 1 is a cross-sectional view showing a schematic configuration of a laser processing apparatus according to an embodiment.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Hereinafter, an embodiment of a laser processing apparatus will be described as an example of an optical processing apparatus. First, a configuration of the laser processing apparatus according to the embodiment will be described.

FIG. 1 is a cross-sectional view showing a schematic configuration of a laser processing apparatus 50 according to an embodiment. In the figure, the laser processing apparatus 50 includes a laser oscillator 1, a beam expanding optical system 2, a beam converting unit 5, a rotating stage 7, an aperture 8, a vertical stage 9, an xy table 10, a table base 11, a stage elevating mechanism 12, a vertical movement motor 13, and a stage rotation motor 14.

The laser oscillator 1, as a light oscillation means, outputs laser light L having a wavelength λ. The full width at half maximum pulse duration of the laser light L is from 100 femtoseconds to 1 microsecond. The beam of the laser light L is a so-called Gaussian beam.

The laser light L oscillated from the laser oscillator 1 enters the beam expansion optical system 2. The beam expanding optical system 2 has a first lens 3 and a second lens 4. The first lens 3 and the second lens 4 can increase the diameter of the laser light L and emit the laser light L as a light flux. The emitted laser light L enters the beam conversion unit 5.

The beam conversion unit 5 holds the convex axicon lens 6 inside a cylindrical casing. The laser light L having entered the housing of the beam conversion unit 5 passes through the convex axicon lens 6 which is a light collecting means. The convex axicon lens 6 converges the beam of the laser light L incident thereon and converts it into a Bessel beam having a ring-shaped cross-sectional shape.

The Bessel beam as the laser beam L emitted from the beam conversion unit 5 passes through the through hole of the aperture 8 fixed to the rotary stage 7 and then passes through the glass substrate 100 as an object to be processed fixed on the xy table 10. Then, the glass substrate 100 is processed and cut with a diameter of 10 μm or less on the processed surface of the glass substrate 100.

Figure 2:
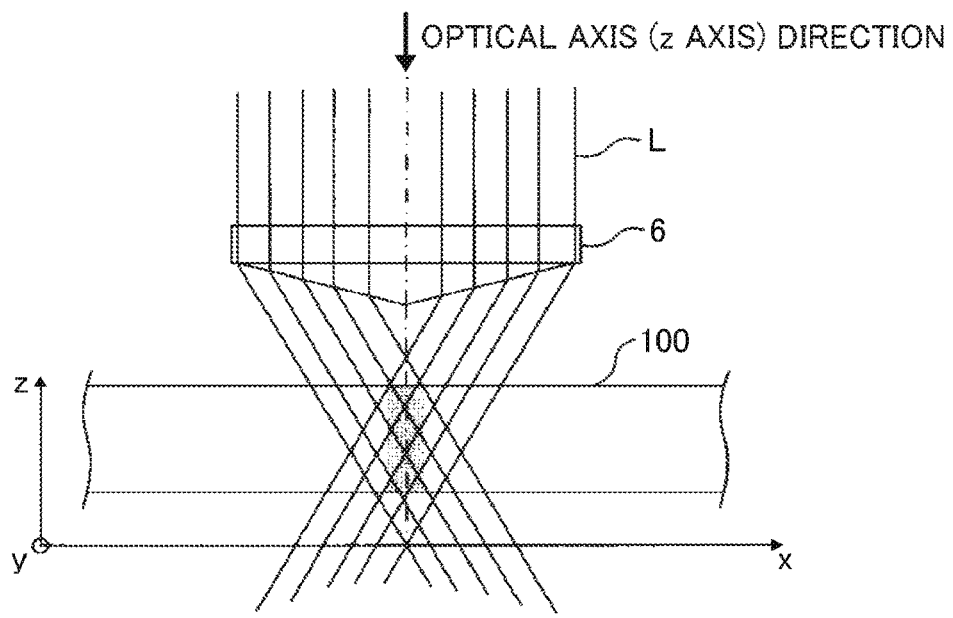
FIG. 2 is a schematic view showing the state of condensing laser light L by a convex axicon lens of the laser processing apparatus.

Speaking of a general laser beam, only the surface on which the laser beam is focused is laser-processed, and the glass substrate 100 is cut by making a crack at a position below the surface. For this reason, it is impossible to cleanly cut the cut surface. On the other hand, as is well known, the Bessel beam has a much longer focal length in the optical axis direction than a general laser beam. For this reason, as shown in FIG. 2, it is possible to perform focusing over the entire region in the thickness direction of the glass substrate 100 and to cut the entire region in the thickness direction by laser processing, so that the cut surface can be cleanly processed.

The xy table 10 shown in FIG. 1 is held in a state held on the table base 11. The xy table 10 can move in the x-axis direction (hereinafter also referred to as x direction) orthogonal to the optical axis (z axis) direction and in the y-axis direction (hereinafter also referred to as the y direction) independently. By moving the xy table 10 in the x direction and the y direction, the laser processing position for the glass substrate 100 is adjusted.

The functions of the rotation stage 7, the aperture 8, the vertical stage 9, the stage elevating mechanism 12, the vertical movement motor 13, and the stage rotation motor 14 will be described later.

As described above, by converting the beam of the laser beam L into a Bessel beam by the convex axicon lens 6 and focusing it on the processed surface of the glass substrate 100, it is possible to process the cut surface cleanly. However, there was a problem that discoloration might occur in the cut surface (processed surface) and the vicinity thereof. In manufacturing the touch panel by processing the glass substrate 100, if the transparency of the touch panel is lowered due to the discoloring, the commercial value is lowered. In addition, the material may be reformed at the cut surface (processed surface) or in the vicinity thereof, thereby deteriorating the material properties (for example, weakening the rigidity, etc.). For example, in the case of manufacturing a touch panel, there is a fear that the touch panel can be easily broken by the above-described modification.

As a result of the research by the present inventor, the following findings have been made on the cause of discoloration and reforming of the cut surface and its vicinity. That is, the Bessel beam of the laser beam L, immediately after passing through the convex axicon lens 6, has a ring-shaped cross-sectional shape. The ring of this cross sectional shape decreases the ring diameter as it gets closer to the focused position, that is, the processed surface of the glass substrate 100, and becomes a circle when it reaches the processed surface. Then, the energy of the circular beam on the processed surface decreases from the center to the outer edge.

Figure 3:
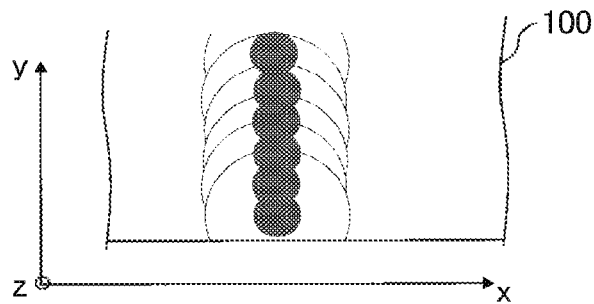
FIG. 3 is a schematic diagram showing a history on a processed surface of a Bessel beam spot intermittently irradiated on a glass substrate with a very short period in the laser processing apparatus.
Figure 4:
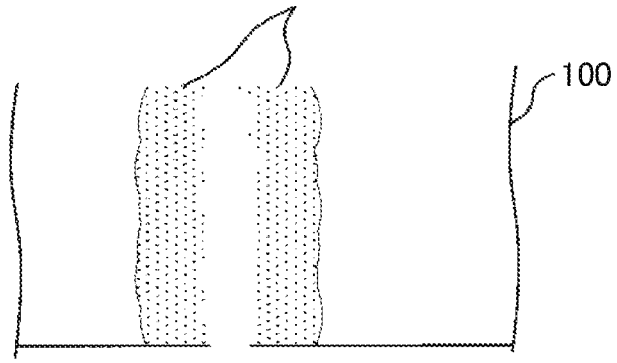
FIG. 4 is a schematic view showing a state of discoloration in a cut surface of a glass substrate processed by a conventional laser processing apparatus and its vicinity.

FIG. 3 is a schematic diagram showing a history on the processed surface of spots of Bessel beam intermittently irradiated to the glass substrate 100 at a very short cycle. In the same drawing, what is indicated by a thin circle is a spot shape on the processed surface of the Bessel beam. The entire area of the spot does not contribute to the cutting of the glass substrate 100, and only the central portion of the spot indicated by the black circle in the figure contributes to the cutting. However, even though it is outside the central portion of the spot, since it has a certain amount of energy, it does not contribute to cutting but alters the glass of the glass substrate 100. As a result of this alteration, as shown in FIG. 4, discoloration and reforming are caused in the cut surface and the vicinity thereof.

Figure 5:
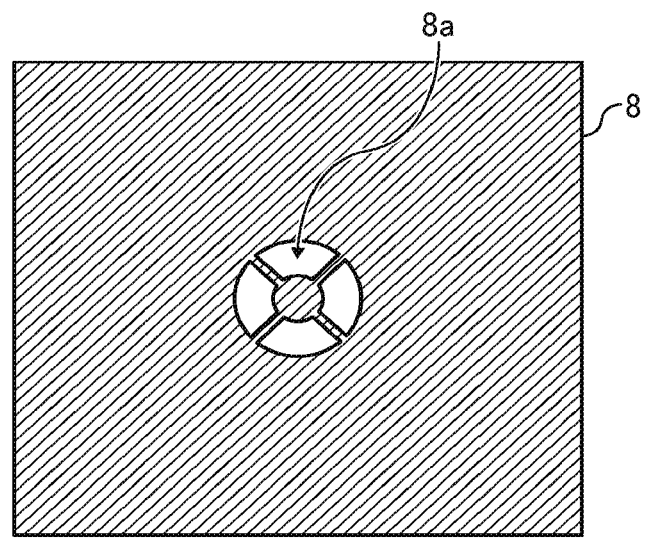
FIG. 5 is a cross-sectional view showing an aperture of the laser processing apparatus.

Next, a characteristic configuration of the laser processing apparatus 50 will be described. FIG. 5 is a cross-sectional view showing the aperture 8 of the laser processing apparatus 50. The aperture 8 has a ring-shaped through hole 8a. In FIG. 1, the Bessel beam as the laser beam L that passed through the convex axicon lens 6, and has a ring-shaped sectional shape, reaches the glass substrate 100 after passing through the through hole 8a on the ring of the aperture 8.

Figure 6:
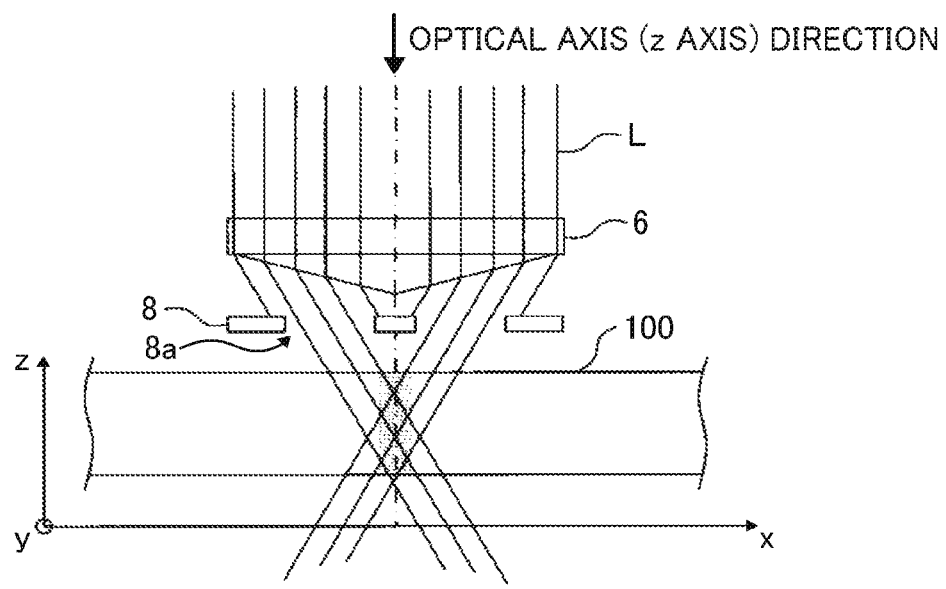
FIG. 6 is a schematic view showing the state of the laser beam L until it reaches the glass substrate after passing through the convex axicon lens in the laser processing apparatus.
Figure 7:
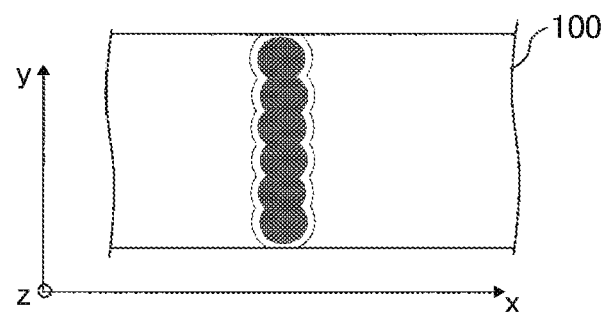
FIG. 7 is a schematic view showing a glass substrate processed by the laser processing apparatus.

FIG. 6 is a schematic view showing the state of the laser beam L until it reaches the glass substrate after passing through the convex axicon lens in the laser processing apparatus. As shown in the figure, the Bessel beam as the laser beam L that has a ring-shaped cross-sectional shape passes through the ring-shaped through hole 8a of the aperture 8 after passing through the convex axicon lens 6. At the same time, the inner edge of the ring is also shielded by the aperture 8. For this reason, the Bessel beam as the laser beam L that has passed through the ring-shaped through hole 8a of the aperture 8 is converged on the processed surface of the glass substrate 100 in a state where the outer edge portion of the ring and the inner edge portion of the ring are removed. Then, as shown in FIG. 7, as a circular spot of Bessel beam on the processed surface of the glass substrate 100, only the central portion contributing to the cutting of the glass substrate 100 is left, the outer edge portion which does not contribute to the cutting can be substantially eliminated. This makes it possible to suppress the occurrence of discoloration in the cut surface and in the vicinity thereof due to abutment of the outer edge portion which does not contribute to cutting the periphery of the cut portion.

In FIG. 1, a rotary stage 7, on which an aperture 8 is fixed on its own surface, is held on a vertical stage 9. The upper and lower stages 9 are supported by the stage elevating mechanism 12 in a manner supported by the stage. The stage elevating mechanism 12 vertically moves the vertical stage 9 by driving the vertical movement motor 13. The direction of the vertical movement is the same as the direction of the optical axis (z axis). As the vertical stage 9 moves up and down, the aperture 8 fixed to the rotary stage 7 also moves up and down.

Figure 8:
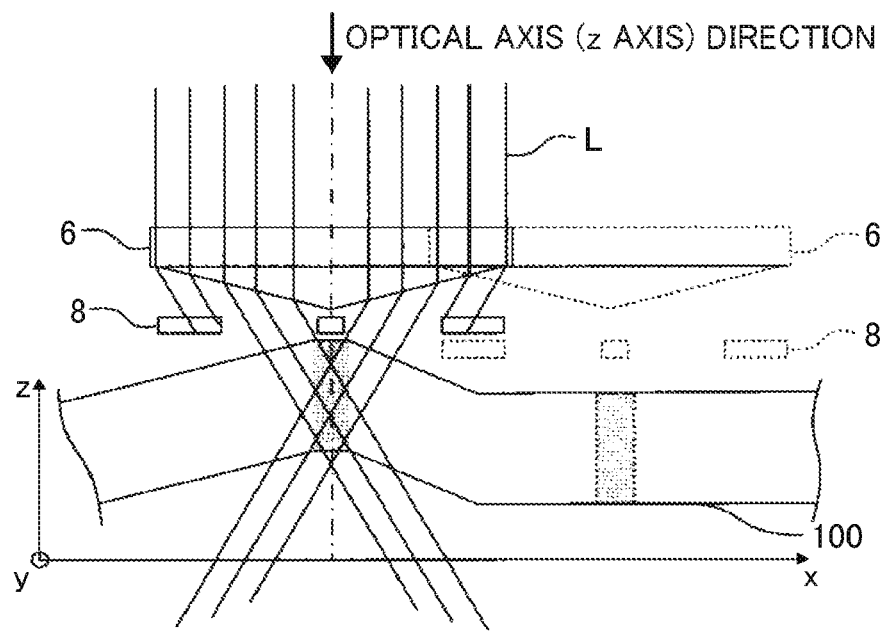
FIG. 8 is a schematic diagram showing the relationship between the surface height of a glass substrate and the vertical movement of the same.

FIG. 8 is a schematic diagram for explaining the relationship between the surface height of the glass substrate 100 and the vertical movement of the aperture 8. Unevenness is formed on the surface of the glass substrate 100 shown in FIG. 8. Therefore, the thickness of the glass substrate 100 is not uniform in the planar direction. In cutting a portion whose surface is convex, it is necessary to bring the focal position closer to the convex axicon lens 6, as compared with the case of cutting a portion where the surface is not convex. Therefore, as for the height of the aperture 8, it is necessary to be set according to the surface height of the glass substrate 100 on the position to be processed. In other words, it is necessary to set the height of the aperture 8 to a value corresponding to the surface height at the processing position of the glass substrate 100. In order to enable such setting, in the laser processing apparatus 50, the height position of the aperture 8 can be adjusted by the vertical movement of the vertical stage 9. With such a configuration, even on an object to be processed having an uneven surface, the processed surface can be cleaned regardless of its surface irregularities.

Figure 9:
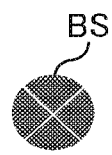
FIG. 9 is a schematic view showing a beam spot on a processed surface in the laser processing apparatus.

Although the planar shape of the through hole 8a of the aperture 8 shown in FIG. 5 is expressed as a ring shape above, strictly speaking, as shown in the drawing, four ribs are provided in the ring. The four ribs are for holding a circular light shielding portion positioned inside the ring inside the ring. The Bessel beam of the laser beam L is shielded even at the rib portion. Therefore, in FIG. 7, for convenience, the spot of the Bessel beam on the processed surface of the glass substrate 100 is shown as a circle. However, strictly speaking, as shown in FIG. 9, the beam spot BS is formed by arranging the four fan shapes at positions shifted in phase by 90 [°] with respect to the circle center, and arranging the fan spaced each other. The interval portion corresponds to the above-mentioned rib portion. If the spacing portion is brought into contact with the substrate main body side (the side used as a processed product) after the cutting, burrs are generated on the substrate portion corresponding to the interval. For this reason, it is desirable to apply a fan-shaped portion to the substrate main body side of the glass substrate 100 rather than the interval of the beam spot BS.

Therefore, in the laser processing apparatus 50, as necessary, the aperture 8 can be rotated to shift the spacing portion of the beam spot BS from the position on the substrate main body side of the glass substrate 100.

Figure 10:
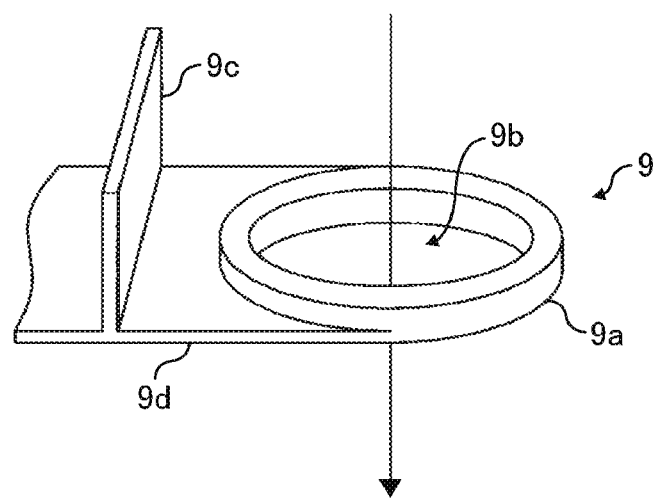
FIG. 10 is a perspective view showing upper and lower stages of the laser processing apparatus.

FIG. 10 is a perspective view showing the upper and lower stages 9 of the laser processing apparatus 50. The vertical stage 9 has a plate-shaped base portion 9d, a ring rail 9a held by the base portion 9d, a circular opening 9b formed inside the base portion 9d, a motor fixing portion 9c rising vertically from the plane of the base portion 9d, and the like. The laser beam L passes around the center of the circular opening 9b on the inner side of the ring-shaped ring rail 9a as indicated by an arrow in the figure.

Figure 11:
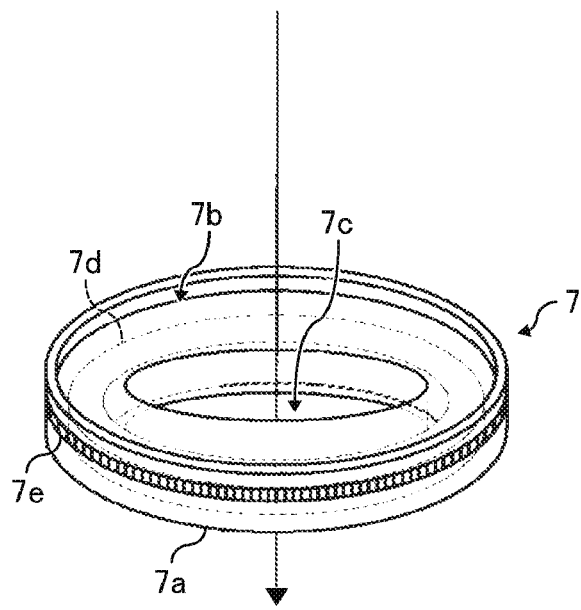
FIG. 11 is a perspective view showing a rotary stage held by the upper and lower stages.

FIG. 11 is a perspective view showing the rotary stage 7 held by the vertical stage 9 of FIG. 10. The rotary stage 7 includes a ring-shaped main body portion 7a, an aperture fixing surface 7b formed on the upper surface of the ring-shaped main portion 7a, a circular opening 7c formed in the central portion of the main body portion 7a, a ring-shaped concave portion 7d, a gear portion 7e formed around the entire periphery of the main body portion 7a, and the like.

When this rotary stage 7 is set on the vertical stage 9 in FIG. 10, the ring-shaped concave portion 7d formed at the bottom of the rotary stage 7 is engaged with the ring rail 9a of the vertical stage 9. As a result, the rotary stage 7 is rotatably held by the vertical stage 9.

The laser beam L passes around the center of the circular opening 7c of the rotary stage 7, as indicated by the arrow in FIG. 11. The aperture 8 shown in FIG. 5 is fixed to the aperture fixing surface 7b of the rotary stage 7 shown in FIG. 11.

Figure 12:
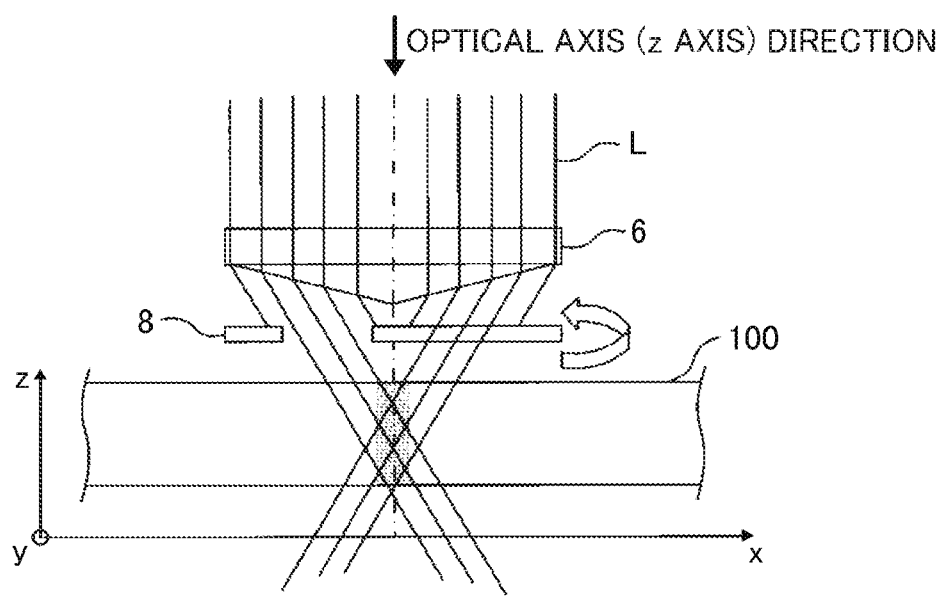
FIG. 12 is a schematic view showing a state of rotation of an aperture in the laser processing apparatus.

The stage rotation motor 14 shown in FIG. 1 is fixed to the motor fixing portion 9c of the vertical stage 9 shown in FIG. 10. Then, the motor gear fixed to the motor shaft is meshed with the gear portion 7e on the outer periphery of the rotation stage 7 shown in FIG. 11. As the rotation stage 7 is rotated by the rotation of the stage rotation motor 14, the aperture 8 fixed to the aperture fixing surface 7 b of the rotation stage 7 can be rotated as shown in FIG. 12. As a result, the distance between the beam spots BS can be shifted from the position on the substrate main body side of the glass substrate 100. Therefore, it is possible to avoid occurrence of burrs by hitting the portion of the interval to the position of the substrate main body side.

Figure 13:
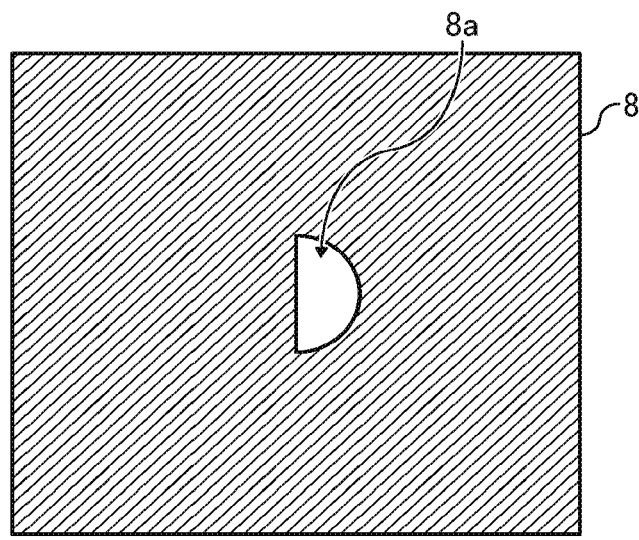
FIG. 13 is a cross-sectional view showing a modified example of the aperture.
Figure 14:
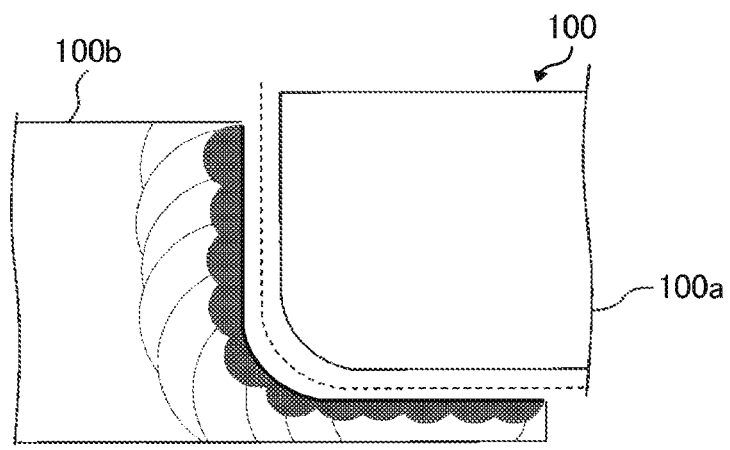
FIG. 14 is a schematic view showing the state of processing a glass substrate in the case of using the aperture of the modified example.

Instead of the aperture 8 provided with the ring-shaped through hole 8a, as shown in FIG. 13, a semicircular through hole 8a may be used. In the case of using such an aperture 8, only one half of the beam spot of the Bessel beam is made to have a small diameter except for the central portion, and the other half is made to have a large diameter including the outer edge portion. As shown in FIG. 14, the small spot portion is positioned on the substrate main body side (the side used as a light processed object) 100a of the glass substrate 100 and the large diameter spot portion is positioned on the disposal side 100b of the glass substrate 100, by adjusting the rotation angle of the aperture 8.

Although an example of laser processing the glass substrate 100 (about 500 μm in thickness) as the object to be processed has been described, the object to be processed is not limited to the glass substrate 100 as long as it is a material that can be processed with laser light L.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An optical processing apparatus comprising:
   a light source configured to emit light;
   a condensing lens configured to convert the light emitted from the light source into a Bessel beam and condense the light onto a surface of an object; and
   a light shield configured to shield an outer edge portion of the light in a cross section of a direction orthogonal to an optical axis of the light,
   wherein the light shield shields the outer edge portion and an interior portion of the light after entering the condensing lens and before condensing onto the surface of the object in the cross section of the direction orthogonal to the optical axis of the light.

2. The optical processing apparatus according to claim 1, wherein the condensing lens includes an axicon lens, the axicon lens being configured to shape the light.

3. The optical processing apparatus according to claim 2, wherein the axicon lens is configured to shape the light into a round shape.

4. The optical processing apparatus according to claim 1, further comprising a moving motor that moves the light shield in a direction of the optical axis.

5. The optical processing apparatus according to claim 1, further comprising a rotating motor that rotates the light shield around the optical axis.

6. The optical processing apparatus according to claim 5, wherein the light shield changes the cross-sectional shape of the light after entering the condensing lens and before condensing onto the surface of the object to a point symmetrical shape about the optical axis.

7. The optical processing apparatus according to claim 1, wherein the light source is configured to emit a laser light for which a full width at half maximum pulse duration is from 100 fs to 1 ms.

8. A method for processing an object comprising:
converting, with a condensing lens, a light emitted from a light source into a Bessel beam and condensing the light onto a surface of an object; and
shielding, with a light shield, an outer edge portion of the light in a cross section of a direction orthogonal to an optical axis of the light,
wherein the light shield shields the outer edge portion and an interior portion of the light after entering the condensing lens and before condensing onto the surface of the object in the cross section of the direction orthogonal to the optical axis of the light.

9. The method according to claim 8, wherein the condensing lens includes an axicon lens, the method including shaping the light with the axicon lens.

10. The method according to claim 9, wherein the axicon lens shapes the light into a round shape.

11. The method according to claim 8, further comprising moving the light shield, with a moving motor, in a direction of the optical axis.

12. The method according to claim 8, further comprising rotating the light shield, with a rotating motor, around the optical axis.

13. The method according to claim 12, wherein the light shield changes the cross-sectional shape of the light after entering the condensing lens and before condensing onto the surface of the object to a point symmetrical shape about the optical axis.

14. The method according to claim 8, wherein the light source emits a laser light for which a full width at half maximum pulse duration is from 100 fs to 1 ms.

* * * * *